(12) United States Patent
Razumov (10) Patent No.: US 7,558,743 B2
(45) Date of Patent: Jul. 7, 2009

(54) SYSTEM FOR PURCHASE CHECK-OUT ARRANGEMENT IN RETAIL SYSTEM

(76) Inventor: Sergey N. Razumov, Electricheskiy Pereulok, dom 8, korpus 4 kvartira 7, Moscow (RU)

( * ) Notice: Subject to any disclaimer, the term of this patent is extended or adjusted under 35 U.S.C. 154(b) by 1059 days.

(21) Appl. No.: 09/788,674

(22) Filed: Feb. 21, 2001

(65) Prior Publication Data

US 2002/0016715 A1    Feb. 7, 2002

Related U.S. Application Data

(60) Provisional application No. 60/222,292, filed on Aug. 1, 2000, provisional application No. 60/233,664, filed on Sep. 19, 2000.

(51) Int. Cl.
   *G06Q 30/00* (2006.01)
(52) U.S. Cl. .......................... 705/26; 186/53
(58) Field of Classification Search ............ 705/26, 705/27, 7, 22
   See application file for complete search history.

(56) References Cited

U.S. PATENT DOCUMENTS

| | | | | |
|---|---|---|---|---|
| 3,741,345 A | * | 6/1973 | Saridis ..................... 186/55 |
| 4,836,352 A | * | 6/1989 | Tateno et al. ............. 194/215 |
| 4,894,717 A | * | 1/1990 | Komei ...................... 348/150 |
| 4,896,024 A | * | 1/1990 | Morello et al. ............ 235/381 |
| 5,091,713 A | * | 2/1992 | Horne et al. .............. 340/541 |
| 5,118,175 A | * | 6/1992 | Costello .................... 312/242 |
| 5,126,732 A | * | 6/1992 | Mardon ................... 340/5.53 |
| 5,158,155 A | * | 10/1992 | Domain et al. ............ 186/53 |
| 5,168,961 A | | 12/1992 | Schneider |
| 5,206,643 A | * | 4/1993 | Eckelt ..................... 340/932.2 |
| 5,223,829 A | * | 6/1993 | Watabe ..................... 340/5.73 |
| 5,231,272 A | * | 7/1993 | Mardon ..................... 235/382 |
| 5,264,685 A | * | 11/1993 | Eisermann ................ 235/382.5 |
| 5,386,462 A | * | 1/1995 | Schlamp ................... 379/93.12 |
| 5,482,139 A | * | 1/1996 | Rivalto ...................... 186/36 |
| 5,635,906 A | * | 6/1997 | Joseph ..................... 340/572.3 |
| 5,774,053 A | * | 6/1998 | Porter |
| 6,010,064 A | * | 1/2000 | Umeda et al. ............. 235/375 |
| 6,116,506 A | * | 9/2000 | Matsumoto et al. ...... 235/382.5 |
| 6,230,971 B1 | * | 5/2001 | Matsumoto et al. ......... 235/380 |
| 6,263,316 B1 | * | 7/2001 | Khan et al. ................ 705/13 |
| 6,323,782 B1 | * | 11/2001 | Stephens et al. ......... 340/10.31 |
| 6,862,576 B1 | * | 3/2005 | Turner et al. ................ 705/26 |

(Continued)

OTHER PUBLICATIONS

Ogilvie, Tim, U.S. Appl. No. 60/161,927, Unattended B to B cross-docking system, dated Oct. 28, 1999.*

(Continued)

*Primary Examiner*—Mark Fadok
(74) *Attorney, Agent, or Firm*—McDermott Will & Emery LLP (57) ABSTRACT

A novel retail system with a purchase check-out mechanism enabling customers to pick up pre-ordered purchases is provided. The retail system comprises at least one purchase check-out facility having multiple purchase pick-up points, and an assignment arrangement for assigning the purchase pick-up points to the customers. A customer is provided with information identifying a purchase pick-up point assigned to that customer. A request for collecting a purchase pre-ordered by a customer is issued simultaneously with assigning a purchase pick-up point for that customer. The collected purchase is delivered to the assigned purchase pick-up point.

7 Claims, 4 Drawing Sheets

U.S. PATENT DOCUMENTS

| | | | | |
|---|---|---|---|---|
| 6,865,539 | B1* | 3/2005 | Pugliese, III | 705/5 |
| 2001/0032443 | A1* | 10/2001 | Tiley et al. | 53/476 |
| 2002/0077937 | A1* | 6/2002 | Lyons et al. | 705/28 |
| 2004/0236635 | A1* | 11/2004 | Publicover | 705/26 |

OTHER PUBLICATIONS

Franco, Hector, U.S. App. No. 60/192,291, "Consumer product distribution system", dated Mar. 27, 2000.*

Dai-Ichi, "New delivery lockers allow 24-hour access with electronic money", Comline Telecommunications, Mar. 11, 1998.*

* cited by examiner

SYSTEM FOR PURCHASE CHECK-OUT ARRANGEMENT IN RETAIL SYSTEM

The present application claims priority of U.S. provisional application No. 60/222,292 filed on Aug. 1, 2000 and entitled "RETAIL SYSTEM USING INTERNET PRODUCT ORDERING", and U.S. provisional application No. 60/233,664 filed on Sep. 19, 2000 and entitled "SHOPPING FACILITY FOR INTERNET-BASED RETAIL SYSTEM", both applications being incorporated herewith by reference.

FIELD OF THE INVENTION

The present invention relates to retail systems, and more specifically, to a check-out facility that enables customers of a retail system to receive purchases ordered in advance.

BACKGROUND OF THE INVENTION

Multiple solutions have been offered to implement a check-out mechanism in a retail facility. For example, U.S. Pat. No. 5,168,961 describes a supermarket having self-service check-out stations arranged in two opposite rows to enable shopping carts to exit between the opposite rows. The check-out stations contain bar code scanners for reading pre-printed bar code labels provided on produce bags carried in the shopping carts. Floor markings are provided to indicate movement paths to and from the check-out stations.

However, the productivity of the described self-service check-out system does not exceed the productivity of a regular supermarket. Therefore, the system's throughput is not sufficient to avoid long lines at the check-out area during rush hours.

Thus, there exists a need for a check-out arrangement with a throughput sufficiently high to enable customers to avoid waiting in lines even during rush hours.

Also, it would be desirable to create a check-out arrangement that would provide a high check-out throughput at a floorspace substantially less than the floorspace of a regular supermarket.

Further, it would be desirable to create a check-out arrangement that would make it possible to maintain a high check-out throughput using a reduced number of sales assistants involved in the check-out process.

SUMMARY OF THE INVENTION

The present application provides a novel retail system with a purchase check-out mechanism that addresses problems of the prior art systems. The retail system of the present invention controlled by a control system comprises at least one storage facility for storing goods available for sale in the retail system, and multiple purchase obtaining facilities. Each purchase obtaining facility enabling customers to obtain pre-ordered purchases after a time period sufficient to deliver the pre-ordered purchases from the storage facility to the purchase obtaining facility.

In accordance with a method of selling goods of the present invention, goods available for sale are stored in a storage facility. A customer is enabled to order a purchase. After a time period sufficient to deliver the purchase from the storage facility to a retail facility, the customer is enabled to obtain the ordered purchase at the retail facility.

In accordance with one aspect of the invention, at least one purchase obtaining facility has multiple purchase pick-up points for enabling customers to obtain purchases, and an assignment arrangement for assigning the purchase pick-up points to the customers. A purchase pick-up point may be automatically assigned to a customer when the customer is identified. The customer may be provided with information identifying a purchase pick-up point assigned to that customer.

In accordance with another aspect of the invention, the purchase obtaining facility is arranged for providing the customers with purchases ordered in advance. A time interval between placing an order for a purchase and picking up the ordered purchase should be sufficient to deliver the purchase from a corresponding storage facility to the purchase obtaining facility.

The purchase obtaining facility may contain a storage area for storing the pre-ordered purchases. The assignment arrangement may provide a request for collecting from the storage area a purchase for a customer simultaneously with assigning a purchase pick-up point for that customer. The collected purchase is delivered to the purchase pick-up point assigned to the customer.

In accordance with a further aspect of the present invention, an identification device may be arranged to provide identification of a customer before assigning a purchase pick-up point, to determine information on a purchase pre-ordered by that customer. The identification device may enable the customer to pass through a passing device after the purchase pick-up point is assigned.

The purchase pick-up points may be configured to enable the customers to inspect the purchases and to pay for them.

In accordance with a method of the present invention, the following steps are carried out for selling goods:

arranging multiple purchase pick-up points for enabling customers to obtain purchases, and automatically assigning a purchase pick-up point to a customer when the customer is identified.

The method of the present invention further may comprise the step of providing a request for collecting a purchase pre-ordered by a customer simultaneously with assigning a purchase pick-up point to that customer. The purchase may be delivered to the assigned purchase pick-up point in response to the request for collecting the purchase. The purchase pick-up point may be released from being assigned to the customer when the customer obtain a purchase. For example, the purchase pick-up point may be automatically released when the purchase is checked out by the customer.

In accordance with a further aspect of the invention, the multiple pick-up points may be arranged in a single check-out facility containing a storage area. A request for collecting from the storage area a purchase pre-ordered by a customer is transferred simultaneously with assigning a purchase pick-up point to the customer. The purchase collected in the storage area may be inspected by comparing weight of the collected purchase with a reference value. For example, the reference value may be determined at a central storage facility before delivery to the check-out facility.

In accordance with another aspect of the invention, a system for selling goods is provided with multiple purchase obtaining facilities for enabling customers to obtain pre-ordered purchases. At least one of the purchase obtaining facilities comprises multiple purchase pick-up points, and an assignment arrangement for assigning a specific purchase pick-up point to a customer entering the purchase obtaining facility. The customer is provided with information identifying the specific purchase pick-up point assigned to the customer.

Still other aspects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and entities are shown in schematic form in order to avoid unnecessarily obscuring the present invention.

Figure 1:
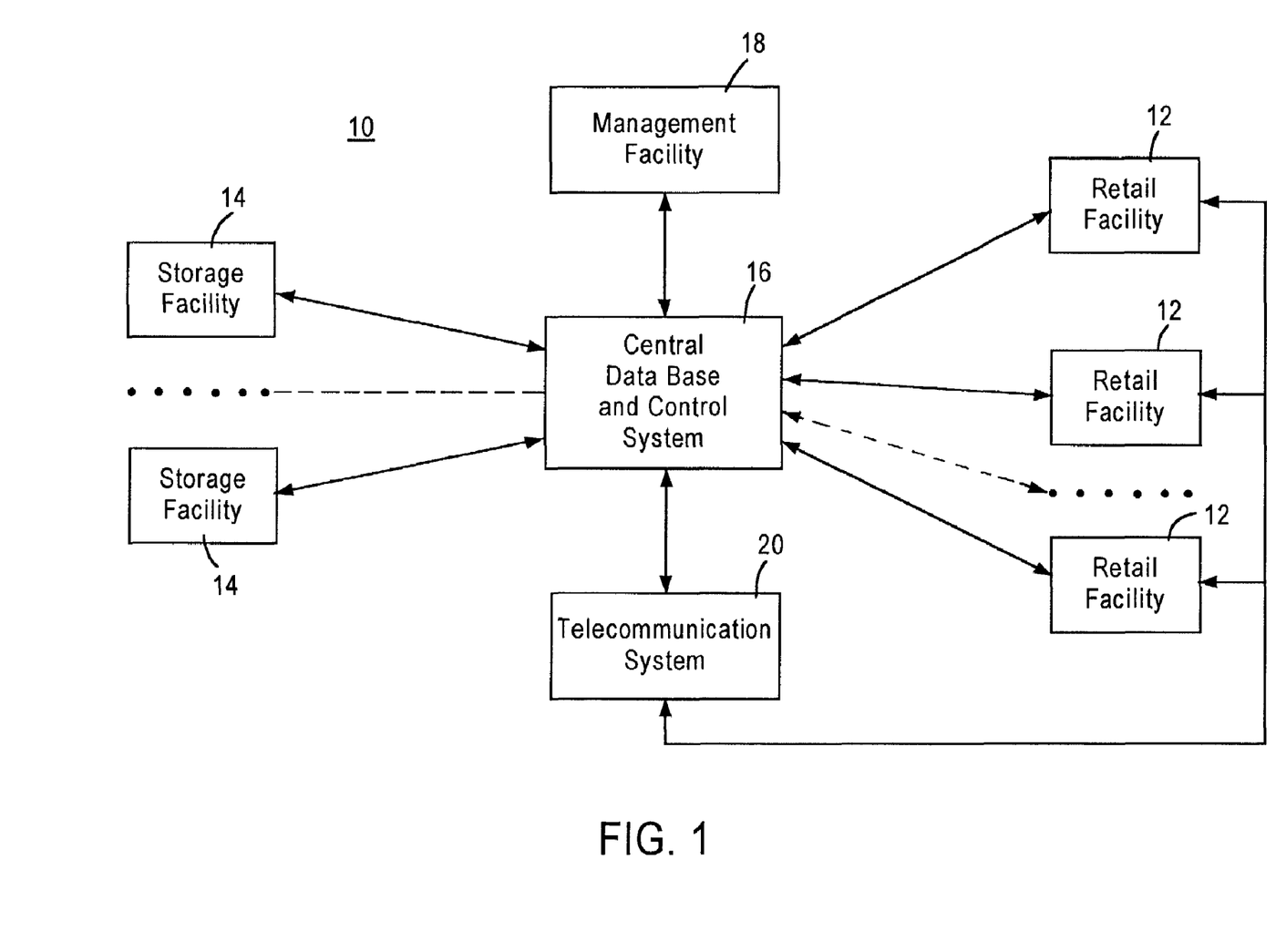
FIG. 1 illustrates a retail system of the present invention.

As schematically illustrated in FIG. 1, a retail system 10 of the present invention may comprise a plurality of retail facilities 12 for enabling customers to order and/or receive purchases, a plurality of storage facilities 14, a central data base and control system 16, a management facility 18, and a telecommunications system 20, such as an Internet-based communications network. For example, the retail system 10 of the present invention may sell such items as food products, consumer goods, video/audio products, etc. A delivery system may be provided to enable delivery of goods to the storage facilities 14, and from the storage facilities 14 to the retail facilities 12.

Each retail facility 12 may be a purchase ordering facility that enables a customer to place an order for a purchase, or a purchase check-out facility that provides the check-out of the purchase ordered by the customer. Alternatively, the purchase ordering facility may be combined with the check-out facility.

In accordance with the present invention, a location for placing an order for a purchase is independent from the location where the ordered purchase may be checked out and picked up. While a customer may place an order and receive the ordered purchase at the same retail facility 12, the customer is enabled to order a purchase at one retail facility 12, and receive the ordered purchase at another retail facility 12. For example, a customer may place a purchase order at the retail facility 12 located near the customer's place of business, and receive the ordered purchase at the retail facility 12 located near the customer's residence.

The storage facilities 14 are provided for storing goods available for sale via the retail facilities 12. Also, the storage facilities 14 may provide collecting of items to prepare the ordered purchases to be delivered to the respective retail facility 12. For instance, one storage facility 14 may be provided in a particular area to supply the retail facilities 12 arranged in that area with the ordered purchases. A time interval between placing an order for a purchase and picking up the ordered purchase should be sufficient to deliver the purchase from the corresponding storage facility 14 to the retail facility 12.

The central data base and control system 16 performs collection, storage and processing of data required to support operations of the retail system 10. Also, the central data base and control system 16 supports interactions between various elements of the retail system 10. For example, the central data base and control system 16 may provide the storage facilities 14 with purchase order information in response to purchase order requests from the retail facilities 12.

The management facility 18 performs management and administrative functions required to support operations of the retail system 10. For example, the management facility 18 may monitor retail system operations to detect and correct errors and malfunctions. Also, the management facility 18 may be responsible for maintaining adequate amount of goods at the storage facilities 14, collecting and analyzing sales information, marketing, and establishing prices.

The telecommunications system 20 enables customers to place purchase orders from locations remote with respect to the retail system facilities. In particular, the retail facilities 12 of the present invention may provide the check-out of purchases ordered via the Internet or a telephone system. The telecommunications system 20 may support the customer's access to the central data base and control system 16 to receive information on product availability and prices.

To facilitate the ordering process, the customer may be provided with a data storage device, such as a CD-ROM or DVD device, which contains information on items available in the retail system 10. The telecommunications system 20 may connect the customer's data storage device to the central data base and control system 16 to update the information stored by the data storage device.

The telecommunications system 20 transmits information on a purchase order placed by a customer to the central data base and control system 16 for arranging purchase delivery from the respective storage facility 14 to the retail facility 12 selected by the customer.

In an alternative embodiment of the invention, the telecommunications system 20 supports placing an order via a telephone system. In this case, a customer can place a telephone call to an operator to order a purchase composed of items selected based on the information provided by the operator or using a list of available items. The present invention enables the customer that made a telephone purchase order to receive the ordered purchase at any retail facility 12 selected by the customer.

Figure 2:
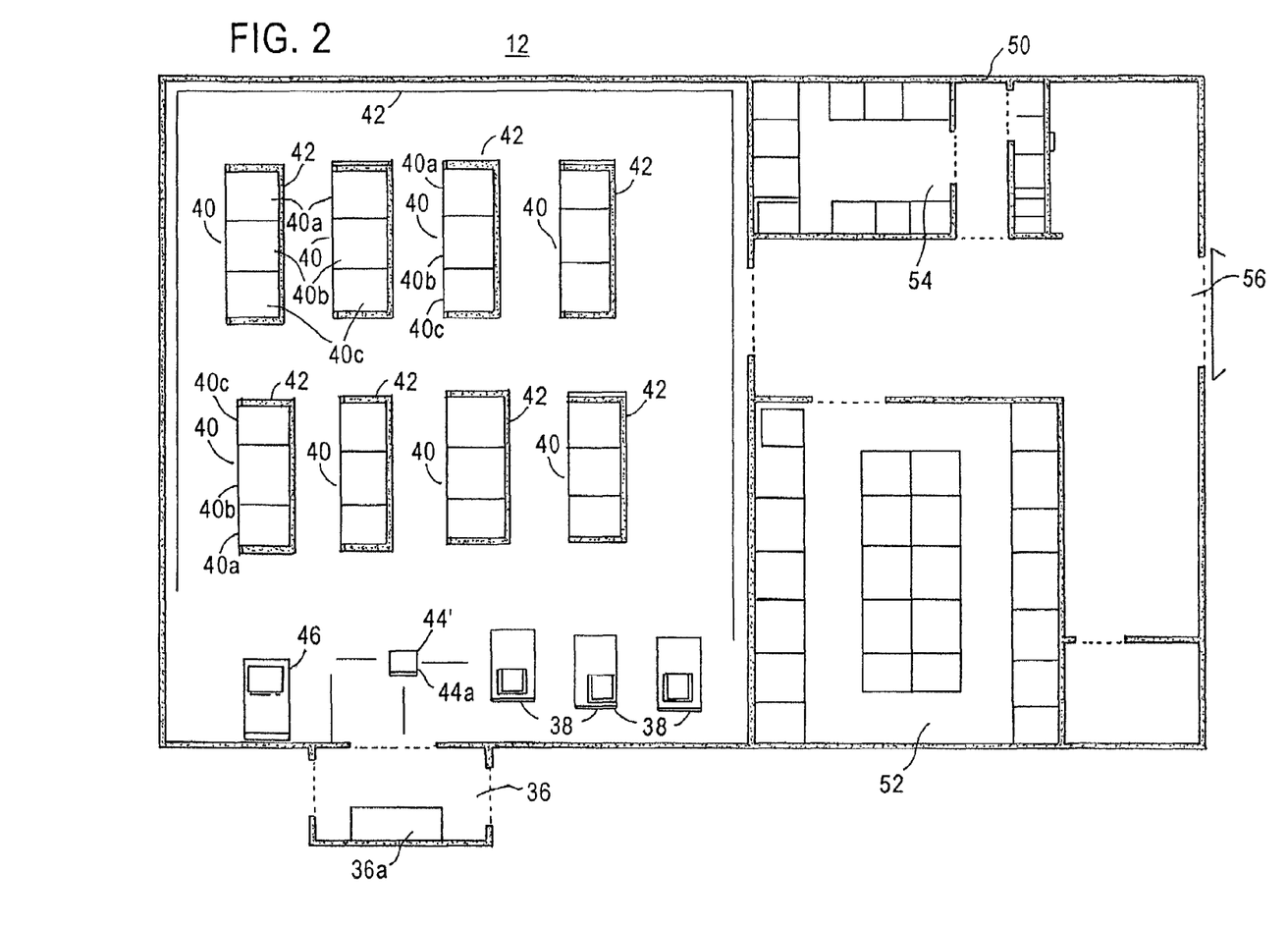
FIG. 2 illustrates an exemplary embodiment of a retail facility in the retail system of the present invention.

FIG. 2 illustrates an exemplary arrangement of the retail facility 12 of the present invention. In the illustrated example, the retail facility 12 combines purchase ordering and purchase check-out facilities. However, as discussed above, the retail facility 12 may be only a purchase ordering facility or only a purchase check-out facility.

The retail facility 12 comprises an entrance/exit area 36 that provides customer's access to the retail facility 12 and enables the customers to exit the retail facility 12. The entrance/exit area 36 may contain a rack 36a for storing customer's bags while the customer is in the retail facility 12.

Multiple check-out stations 38 may be arranged near the exit to enable customers to pay for their purchases. Also, purchase pick-up stations 40 are provided in the retail facility 12. As discussed in more detail later, the purchase pick-up stations 40 enable customers to pick up and inspect their pre-ordered purchases, and confirm that contents of the order is acceptable. Each purchase pick-up station 40 may include multiple purchase pick-up sections 40a, 40b, 40c arranged so as to accommodate a single customer.

If a check-out facility is combined with a purchase ordering facility, multiple showcases, display racks, bins, shelves and the like generally designated by reference number 42 may be provided in the retail facility 12 for holding and displaying samples representative of products available for ordering. The display elements 42 may be arranged along the walls of the retail facility 12 and around purchase pick-up stations 40.

Also, the retail facility 12 may contain an identification and control terminal 44 arranged near the entrance/exit area 36. The identification and control terminal 44 is used for identifying a customer that enters the retail facility 12 to check out a pre-ordered purchase. If a purchase check-out facility is combined in the same room with a purchase ordering facility, the identification and control terminal may distinguish customers that enters the retail facility 12 to check out a pre-ordered purchase from customers that intend to place a purchase order.

As discussed in more detail later, the identification and control terminal 44 interacts with the central data base and control system 16 to assign a purchase pick-up section to each customer that enters the retail facility to check out a pre-ordered purchase. Also, customer's identification provided by the identification and control terminal 44 enables the central data base and control system 16 to issue a request for collecting a purchase pre-ordered by a customer simultaneously with assigning a purchase pick-up section to that customer.

In addition, such identification serves to prevent stealing goods and equipment from the retail facility 12. The identification and control terminal 44 controls a passing device 44a, such as a turnstile, so as to allow a customer to pass through the passing device 44a only after the customer is identified by the identification and control terminal 44. The identification and control terminal 44 may be provided with a data communications circuit for providing data exchange with the central data base and control system 16. A manager's terminal 46 may be arranged for performing management functions.

The retail facility 12 has a service and supply area 50 including a storage section for storing products pre-ordered by customers and delivered from the corresponding storage facility 14. For example, the storage section may include a dry-product storage area 52 for keeping dry products, and a freezing and refrigerating storage area 54 provided with freezing and refrigerating chambers for storing frozen products and products that should be kept refrigerated. A delivery area 56 is arranged for unloading pre-ordered purchases delivered to the retail facility 12 from the corresponding storage facility 14.

Although FIG. 2 illustrates an example in which a purchase check-out facility is provided in the same room with a purchase ordering facility, one skilled in the art will recognize that a purchase check-out facility and a purchase ordering facility may be arranged in separate rooms of the retail facility 12.

Figure 3:
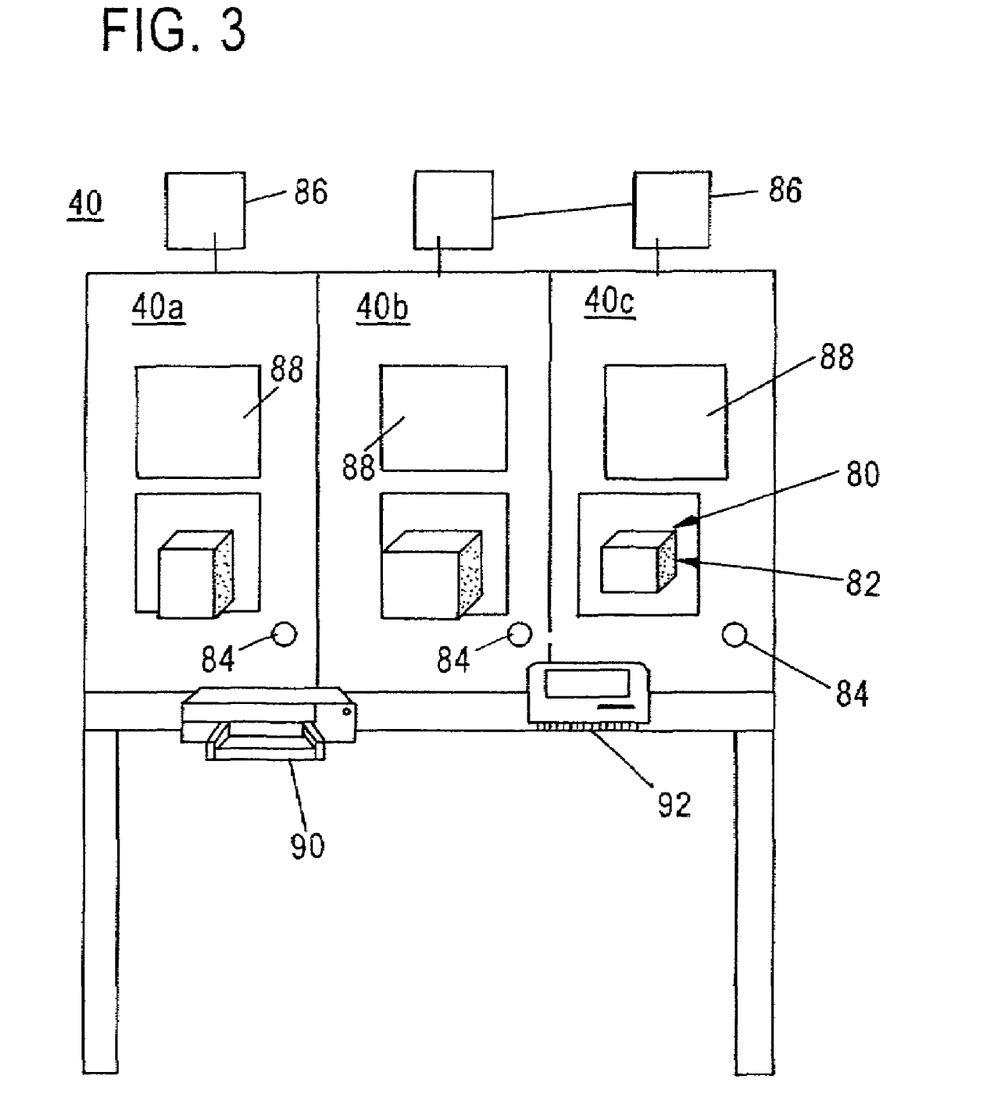
FIG. 3 illustrates an exemplary embodiment of a purchase pick-up station of the present invention.

FIG. 3 illustrates an exemplary embodiment of the purchase pick-up station 40 of the present invention. The purchase pick-up station 40 may have multiple purchase pick-up sections 40a, 40b, 40c, each equipped with a gadget 80 for holding a purchase basket 82.

A control panel 84 may be provided in each purchase pick-up section. For example, the control panel 84 may have an assistance request button for requesting assistance during a purchase pick-up, and a release button activated to confirm that the contents of a delivered purchase is acceptable.

Each purchase pick-up section may have an identification (ID) panel 86 that displays ID data uniquely identifying each purchase pick-up section. For example, a unique number may be assigned to each purchase pick-up section.

An information panel 88 may be arranged to display information to be provided to a customer. For example, the information panel 88 may display purchase pick-up instructions and advertisements. The control panel 84 in combination with the information panel 88 may be used to support a purchase pick-up in an interactive mode, wherein a customer responds by activating the control panel 84 to information provided on the information panel 88.

Also, the purchase pick-up station 40 may be provided with a printing device 90 for printing out purchase receipts, and with a card reader 92 that enables customers to pay for their purchases using customer's cards issued to permanent customers of the retail system 10, or credit cards.

When customers enter the retail facility 12 to pick up pre-ordered purchases, they activate a purchase check-out button on the identification and control terminal 44, and allow the terminal 44 to read their customer's cards. Alternatively, the identification and control terminal 44 may identify a customer by reading its purchase order receipt issued during purchase ordering, or a customer may enter a purchase identification information, such as a purchase number, issued when the customer places an order for that purchase.

When a customer is identified, the identification and control terminal 44 transfers customer's ID information to the central data base and control system 16 that assigns a purchase pick-up section of the purchase pick-up station 40 to that customer. ID information of the assigned purchase pick-up section may be displayed on the identification and control terminal 44, and/or a purchase pick-up ticket indicating the purchase pick-up section's ID information may be issued to the customer. The ID information of the assigned purchase pick-up section may include an ID number and/or other information enabling the customer to locate the assigned purchase pick-up section. When the purchase pick-up section is assigned to a customer, the identification and control terminal 44 activates the passing device 44a to allow the customer to pass through it.

Simultaneously with assigning a purchase pick-up section to a customer, the central data base and control system 16 issues a purchase collection request providing a sales assistant in the service and supply area 50 with purchase information relevant to a purchase order of that customer. For example, the purchase information for a customer may include a purchase order ID number, purchase address information identifying location of the purchase in the storage section of the service and supply area 50, and the ID information of the purchase pick-up section assigned to the customer.

The sales assistant may interact with the central data base and control system 16 in an interactive mode. For example, in response to a message from the central data base and control system 16 indicating a purchase order ID number for a customer's purchase, the sales assistant may use a handheld data processing device, such as a personal digital assistant (PDA), wirelessly connected to the central data base and control system 16 to establish the address information relating to that purchase, and the ID information of the purchase pick-up section to which the purchase should be delivered.

A purchase for a customer may consist of items stored in different storage areas of the service and supply area 50. For example, some items may be stored in the dry-product storage area 52, and other items may be stored in the freezing and refrigerating storage area 54. In this case, the purchase address information provided by the central data base and control system 16 includes address information sufficient to locate each item of the purchase in different storage areas.

One skilled in the art would understand that a purchase for a customer may be collected in various ways. For example, one or multiple purchase baskets may be assigned to each purchase order. Each purchase basket may be provided with indicia to identify the basket in a unique way.

Figure 4:
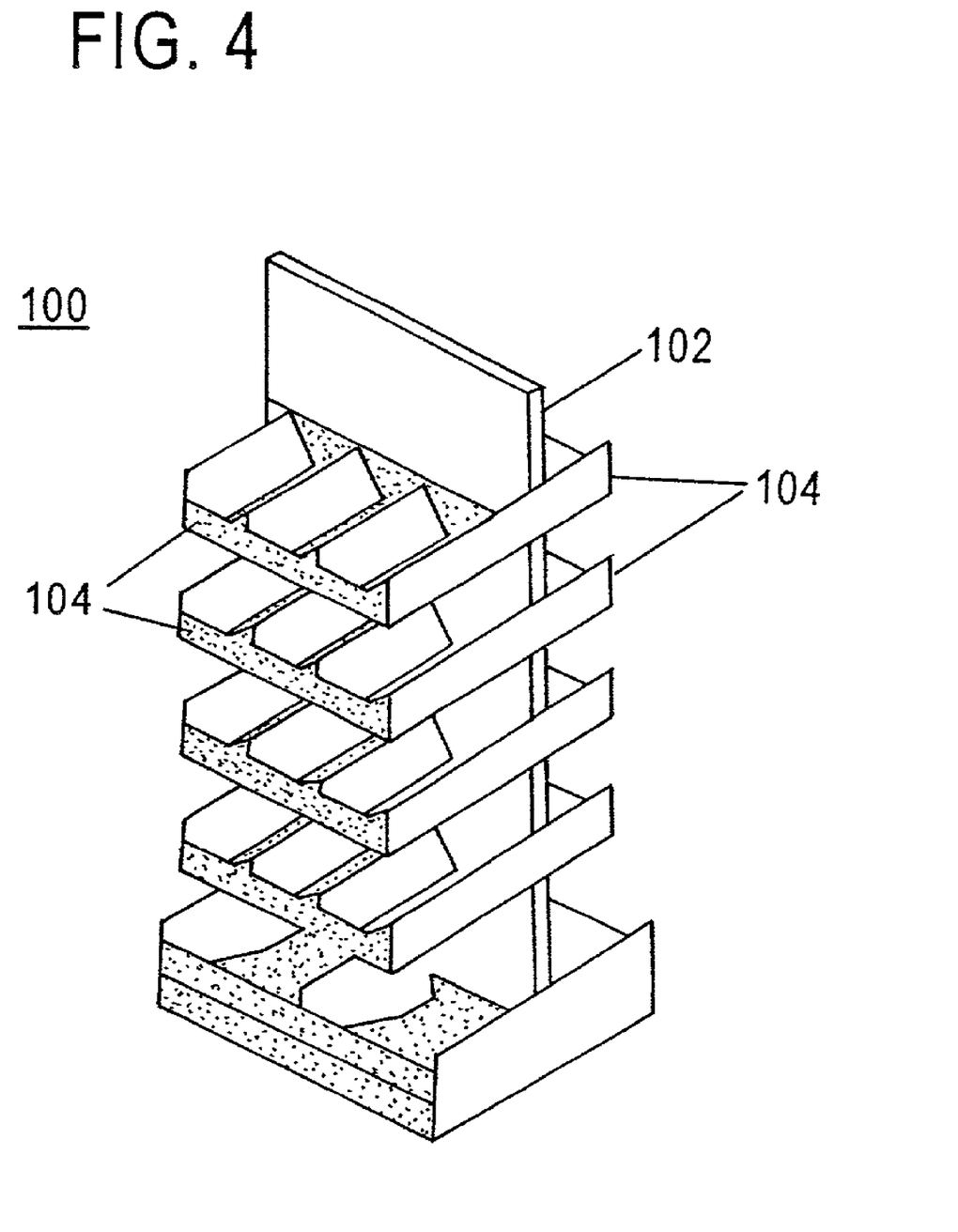
FIG. 4 illustrates an exemplary container used for carrying purchase baskets containing pre-ordered purchases.

Containers are used for transporting purchase baskets from the storage facility 14 to the retail facility 12 and for storing the purchase baskets in the retail facility 12. Multiple purchase baskets may be held by a single container. As illustrated in FIG. 4, a container 100 may have a base wall 102 supporting multiple storage cells 104 for holding purchase baskets. Each storage cell 104 may be identified by a unique address. The container 100 may be provided with turning wheels to facilitate loading and unloading.

A sales assistant collects the purchase baskets relating to an ordered purchase from different storage areas using a storage cart and delivers them to the assigned purchase pick-up section. The storage cart may have multiple sections for holding purchase baskets. Each of the sections may be identified by a unique address.

The central data base and control system 16 controls the purchase collection process. Each purchase basket may be identified with a storage address stored in the central data base and control system 16 to identify the location of the purchase basket inside and outside the retail facility 12. For example, the location of the purchase basket may be identified using addresses of the container's cells, addresses of the storage cart's sections, or ID numbers of the purchase pick-up sections.

When a purchase basket is removed from a container and placed on a storage cart, the storage address of the purchase basket is changed to update its location. Also, the storage address of the purchase basket is changed when it is removed from the storage cart and placed on the assigned purchase pick-up section. The purchase address information provided by the central data base and control system 16 may include a data stream indicating changes in storage addresses of purchase baskets being moved outside and within the retail facility 12. The central data base and control system 16 may control the purchase collection process so as to transport purchase baskets collected for different purchase orders on the same storage cart.

To check whether a purchase composed of one or multiple purchase baskets collected from the various storage areas of the service and supply area 50 is correct, the total weight of the purchase baskets relating to a single purchase order may be compared with a reference weight stored in the central data base and control system 16. For example, the purchase baskets may be weighted when they are installed on the storage cart. The reference weight may be determined when the purchase order is formed in the storage facility 14 before delivery to the retail facility 12.

Alternatively, a collected purchase may be checked by a sales assistant by reading indicia on the purchase baskets representing the purchase. The indicia may be read using a portable scanning device wirelessly coupled to the central data base and control system 16. When the indicia on the first purchase basket is read, the central data base and control system 16 determines which purchase order corresponds to the purchase being checked. After reading indicia on all purchase baskets, the central data base and control system 16 sends to the sales assistant a signal confirming that the purchase is collected correctly. The confirmation signal may be displayed on a display device of the storage cart. If a purchase basket which does not belong to a collected purchase is found on the storage cart, the central data base and control system 16 provides the sales assistant with address information of that basket to enable the sales assistant to place the basket at a correct location in the retail facility 12.

After the central data base and control system 16 confirms that the purchase collected for a customer is correct, the purchase is delivered to the purchase pick-up section assigned to that customer. The purchase pick-up section is configured to enable a customer to inspect an ordered purchase.

If the customer is satisfied with the ordered purchase, he or she may pay for the purchase directly at the purchase pick-up station 40 using a customer's card or a credit card. The payment by a customer automatically releases the purchase pick-up section assigned to that customer. As soon as the purchase pick-up section is released by one customer, it may be assigned to another customer.

Alternatively, a customer satisfied with a purchase may press the release button of the control panel 84 to release the purchase pick-up section assigned to that customer. Thereafter, the customer may pay for the purchase at the check-out station 38.

If a customer is not satisfied with an ordered purchase, he or she may press the assistance request button on the control panel 84 to request assistance of a sales assistant. Using the handheld data processing device, the sales assistant may identify the purchase and remove from it items rejected by the customer. The central data base and control system 16 transfers information on the rejected items into a rejected items data base.

The rejected items are automatically removed from the purchase order of a customer to produce a modified purchase order for that customer. Thereafter, the customer is enabled to pay for the modified purchase order.

After the purchase pick-up process is completed, a purchase receipt is printed out at the purchase pick-up station 40 or at the check-out station 38 depending on the way of payment selected by a customer. The purchase receipt may contain indicia readable by the identification and control terminal 44 to allow the customer to leave the retail facility 12 through the turnstile 44*a*.

Thus, the present invention provides a retail mechanism that involves ordering products, and picking them up after a time interval sufficient to deliver the purchase from a storage facility to a retail facility. As a result, products can be sold at multiple locations without having to stock warehouses full of products at those locations.

Further, in accordance with the present invention, the purchase pick-up section is assigned to a customer as soon as the customer enters the retail facility 12. Simultaneously, the purchase pre-ordered by the customer is collected in the service and supply area 50 for delivery to the assigned purchase pick-up section.

Hence, the present application provides a purchase check-out arrangement that would virtually eliminate lines even during rush hours.

Moreover, the high check-out throughput is achieved at a floorspace substantially less than the floorspace of a regular supermarket using a reduced number of sales assistants involved in the check-out process.

Those skilled in the art will recognize that the present invention admits of a number of modifications, within the spirit and scope of the inventive concepts. For instance, the retail facility 12 and its elements, such as an identification and control terminal 44, purchase pick-up sections 40, and service and supply area 50, may be implemented in a number of different ways. For example, the identification and control terminal 44 may be implemented using specifically engineered chips having logic circuits and other components for performing the functions described above. Alternatively, the identification and control terminal 44 may be implemented using general purpose digital signal processors and appropriate programming.

Further, the purchase pick-up sections 40 may be implemented using an arrangement movable within the retail facility 12. For example, a storage cart used for delivery purchases to the customer may be employed as a pick-up section 40.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A system for selling goods having multiple purchase obtaining facilities for enabling customers to obtain pre-ordered purchases, comprising:
   a storage facility for storing the goods,
   an ordering device enabling a customer to place a purchase order, and
   a telecommunication system that in response to the purchase order placed by the customer requests an ordered purchase to be delivered from the storage facility to a selected purchase obtaining facility,
   the selected purchase obtaining facility comprising:
   multiple purchase pick-up points,
   a service area keeping purchases delivered from the storage facility,
   an identification station receiving identification (ID) data provided by the customer arriving at the selected purchase obtaining facility to obtain the ordered purchase, and
   a control system that:
   receives the ID data from the identification station,
   in response to the ID data received from the identification station, automatically assigns a purchase pick-up point of the multiple purchase pick-up points to the customer,
   determines purchase information on the purchase order placed by the customer based on the ID data provided by the customer, and
   based on the determined purchase information, issues a request for delivery of the ordered purchase from the service area to the purchase pick-up point assigned to the customer,
   wherein the control system automatically releases from assignment to the customer the purchase pick-up point in response to payment by the customer, and assigns the purchase pick-up point to another customer as soon as the purchase pick-up point is released.

2. The system of claim 1, wherein the identification station provides the customer with information identifying the specific purchase pick-up point assigned to the customer.

3. The system of claim 1, wherein the control system provides a reference value to compare weight of a purchase held at the service area with the reference value in order to inspect the purchase.

4. The system of claim 3, wherein the reference value is determined at the storage facility of the system before delivery of the purchase to said selected purchase obtaining facility.

5. The system of claim 1, wherein at least one of the purchase pick-up points provides a purchase pick-up arrangement movable within said selected purchase obtaining facility.

6. The system of claim 5, wherein an arrangement for delivery a purchase to the customer from the service area is used as said movable purchase pick-up arrangement.

7. The system of claim 1, wherein the purchase pick-up point enables the customer to inspect the ordered purchase before the payment is made.

* * * * *